(12) United States Patent
Valentino, III et al.

(10) Patent No.: US 11,080,708 B2
(45) Date of Patent: Aug. 3, 2021

(54) VISUAL ANALYSIS OF TRANSACTIONS

(71) Applicant: eConnect, Inc., Las Vegas, NV (US)

(72) Inventors: Henry Valentino, III, Las Vegas, NV (US); Travis Whidden, Las Vegas, NV (US); Jeremiah Morrill, Las Vegas, NV (US)

(73) Assignee: eConnect Inc., Las Vegas, NV (US)

( * ) Notice: Subject to any disclaimer, the term of this patent is extended or adjusted under 35 U.S.C. 154(b) by 0 days.

(21) Appl. No.: 16/398,009

(22) Filed: Apr. 29, 2019

(65) Prior Publication Data

US 2020/0097973 A1    Mar. 26, 2020

Related U.S. Application Data

(63) Continuation of application No. 14/847,140, filed on Sep. 8, 2015, now Pat. No. 10,275,773, which is a continuation of application No. PCT/US2014/029476, filed on Mar. 14, 2014.

(60) Provisional application No. 61/800,166, filed on Mar. 15, 2013.

(51) Int. Cl.
| | |
|---|---|
| *G06Q 20/40* | (2012.01) |
| *G07F 17/32* | (2006.01) |
| *G06K 9/00* | (2006.01) |
| *G06Q 20/20* | (2012.01) |
| *G06Q 30/00* | (2012.01) |
| *H04N 7/18* | (2006.01) |
| *G07F 19/00* | (2006.01) |

(52) U.S. Cl.
CPC ..... *G06Q 20/4016* (2013.01); *G06K 9/00718* (2013.01); *G06K 9/00771* (2013.01); *G06Q 20/20* (2013.01); *G06Q 20/202* (2013.01); *G06Q 20/206* (2013.01); *G06Q 30/0185* (2013.01); *G07F 17/3241* (2013.01); *H04N 7/18* (2013.01); *G06K 2009/00738* (2013.01); *G07F 19/207* (2013.01)

(58) Field of Classification Search
CPC .................................................... G07F 19/207
See application file for complete search history.

(56) References Cited

U.S. PATENT DOCUMENTS

| | | | | |
|---|---|---|---|---|
| 6,028,626 | A * | 2/2000 | Aviv | G06K 9/00771 348/152 |
| 2005/0177859 | A1* | 8/2005 | Valentino, III | G08B 13/19682 725/105 |
| 2012/0127315 | A1* | 5/2012 | Heier | H04N 7/181 348/150 |
| 2012/0127316 | A1* | 5/2012 | Kundu | G06Q 20/4016 348/150 |

* cited by examiner

*Primary Examiner* — A. Hunter Wilder

(57) ABSTRACT

Technologies and implementations for facilitating visual analysis of transactions utilizing analytics are generally disclosed.

21 Claims, 9 Drawing Sheets

Figure 5

800 A computer program product

802 A signal bearing medium

804 at least one of machine readable non-transitory medium having stored therein instructions that, when executed by one or more processors, operatively enable a transaction analytics/analysis module to:

receive video data associated with a first transaction from a first video device, the first video device corresponding to a first location;

perform video analysis of the first transaction;

determine if the video analysis results in the first transaction is substantially outside a predetermined range;

flag the first transaction if it is determined that the first transaction is substantially outside the predetermined range;

receive subsequent video data associated with a second transaction from the first video device;

perform video analysis of the second transaction;

determine if the second transaction corresponds to the flagged first transaction; and transmit a signal to a second video device to capture the second transaction, the second video device corresponding to a second location and the first and second video devices coordinated to provide alternative views of the second transaction.

| 806 a computer-readable medium | 808 a recordable medium | 810 a communications medium |

Figure 8

VISUAL ANALYSIS OF TRANSACTIONS

RELATED APPLICATION

This application is a continuation of and claims benefit of priority to PCT Application Number PCT/US14/29476, filed on Mar. 14, 2014, titled Visual Analysis of Transactions, which in turn claims benefit of priority to U.S. Provisional Patent Application Ser. No. 61/800,166, filed on Mar. 15, 2013, titled Visual Analysis of Transactions. Both PCT Application Number PCT/US14/29476 and U.S. Provisional Patent Application Ser. No. 61/800,166 are incorporated herein by reference in their entirety.

BACKGROUND

Unless otherwise indicated herein, the approaches described in this section are not prior art to the claims in this application and are not admitted to be prior art by inclusion in this section.

Surveillance cameras have become prevalent in the world. Many entities such as businesses employ some form of surveillance camera to keep a record of transactions. Because of the sheer volume of recorded transactions, information from the surveillance cameras may not necessarily be useful.

SUMMARY

Described herein are various illustrative methods for facilitating visual analysis of transactions utilizing analytics. Example methods may include receiving video data associated with a first transaction from a first video device, where the first video device corresponding to a first location. The example method may also include performing video analysis of the first transaction, determining if the video analysis results in the first transaction is substantially outside a predetermined range, and flagging the first transaction if it is determined that the first transaction is substantially outside the predetermined range. The example method may also include receiving subsequent video data associated with a second transaction from the first video device, performing video analysis of the second transaction, and determining if the second transaction corresponds to the flagged first transaction. The example method may also include transmitting a signal to a second video device to capture the second transaction, the second video device corresponding to a second location and the first and second video devices coordinated to provide alternative views of the second transaction.

The present disclosure also describes various example machine readable non-transitory medium having stored therein instructions that, when executed by one or more processors, operatively enable a transaction analytics/analysis module to receive video data associated with a first transaction from a first video device, where the first video device corresponding to a first location. The example machine readable non-transitory medium having stored therein instructions that, when executed by one or more processors, also operatively enable a transaction analytics/analysis module to perform video analysis of the first transaction, determine if the video analysis results in the first transaction is substantially outside a predetermined range, and flag the first transaction if it is determined that the first transaction is substantially outside the predetermined range. The example machine readable non-transitory medium having stored therein instructions that, when executed by one or more processors, also operatively enable a transaction analytics/analysis module to receive subsequent video data associated with a second transaction from the first video device, perform video analysis of the second transaction, and determine if the second transaction corresponds to the flagged first transaction. The example machine readable non-transitory medium having stored therein instructions that, when executed by one or more processors, also operatively enable a transaction analytics/analysis module to transmit a signal to a second video device to capture the second transaction, the second video device corresponding to a second location and the first and second video devices coordinated to provide alternative views of the second transaction.

The present disclosure additionally describes example systems. Example systems may include a first video device, a second video device, a processor communicatively coupled to the first and second video devices, and a transaction analytics/analysis module communicatively coupled to the processor. The transaction analytics/analysis module may be configured to receive video data associated with a first transaction from the first video device, where the first video device corresponding to a first location. The transaction analytics/analysis module may also be configured to perform video analysis of the first transaction, determine if the video analysis results in the first transaction is substantially outside a predetermined range, and flag the first transaction if it is determined that the first transaction is substantially outside the predetermined range. The transaction analytics/analysis module may also be configured to receive subsequent video data associated with a second transaction from the first video device, perform video analysis of the second transaction, and determine if the second transaction corresponds to the flagged first transaction. The transaction analytics/analysis module may also be configured to transmit a signal to the second video device to capture the second transaction, the second video device corresponding to a second location and the first and second video devices coordinated to provide alternative views of the second transaction.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 5 illustrates an example interface to facilitate interaction with some results of analytics performed on the various transactions;

FIG. 8 illustrates an example computer program product, arranged in accordance with at least some embodiments described herein.

DETAILED DESCRIPTION

Figure 1:
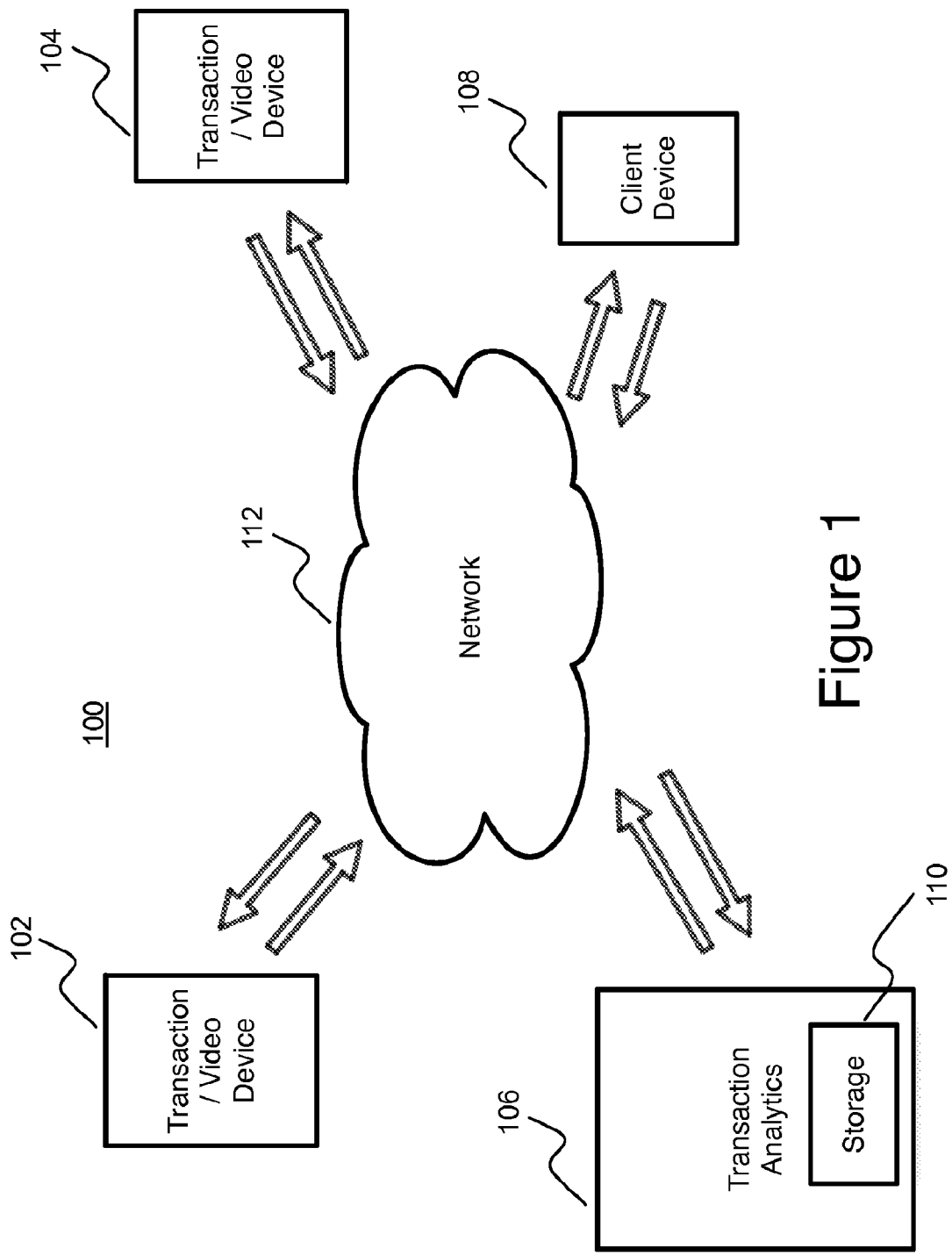
FIG. 1 illustrates an example system for visual analysis of transactions, in accordance with various embodiments.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to facilitating visual analysis of transactions utilizing analytics.

Video surveillance has become common, including video surveillance for transactions involving money. Many transactions may be recorded by video. For example, it may be difficult to go shopping without at least being video recorded at a register where monetary transactions may be common. Even a simple transaction as buying a cup of coffee at a small coffee shop may involve being video recorded during the transaction. If a coffee shop may have video recordings, one could imagine establishments, where money is the product such as gambling establishments (e.g., casinos) and financial establishments (e.g., banks), having a multitude of transactions being video recorded on a daily basis. Video recording so many transactions may result in a large volume of video recordings, and to analyze the large volume of video recordings may be difficult.

There may be several reasons for video surveillance. At least one reason for video recording may be for the benefit of the consumer to help ensure that the transactions occurred appropriately with the establishment. At least another reason may be for the benefit of the establishment to help manage losses or inconsistencies in the transactions. As video technology has become more sophisticated, more and more video recordings may include digital data. Accordingly, video recordings may also be commonly referred to video data. However, because of the large volume of video data, making use of the video data to realize some of these benefits may be difficult.

Transaction information may be included in the video recording adding to the large volume of video data. Transaction information may include information regarding the transaction itself. For example, transaction information may include information of the nature of the transaction (e.g., the item ordered, the total amount, the amount paid, change given, staff, sign in/sign out, etc.).

Various embodiments described herein may be provided for facilitating visual analysis of transactions utilizing analytics. Additionally, various embodiments described herein may help facilitate receiving video data from various transactions involving monetary transactions. One example of a monetary transaction may include a point of sale. A point of sale may include a wide variety of transaction points, but for the purposes of a non-limiting example, the point of sale may be a merchant such as, but not limited to, a coffee shop. Continuing with example of a coffee shop, the coffee shop may have a number of video devices. The video devices may be capable of transaction recognition, in accordance with various embodiments.

In various embodiments, it may be determined whether the performed analytics is substantially within a predetermined range. If the performed analytics is substantially within a predetermined range, one or more selectable events may be flagged. The one or more selectable events may be generated based at least in part on the performed analytics.

By way of a non-limiting example, an establishment such as, but not limited to, a coffee shop may have one or more video devices gathering video data associated with the transactions occurring in the coffee shop. At least one of the video devices may be positioned to record information associated with the monetary transaction (e.g., registers). The video device may record video data along with the information, where the information may include information such as, but not limited to, the nature of the transaction (e.g., the item ordered, the total amount, the amount paid, change given, staff, sign in/sign out, etc.). For example, the information may include information regarding voided transactions. In accordance with various embodiments, video data may be included in the information. The information may be gathered for any length of time generating a large volume of information. In order to analyze the large volume of information, analytics may be performed on the information. As will be described in further detail, one or more selectable events may be generated based at least in part on the performed analytics. Additionally, the one or more selectable events may be correlated with the information.

Continuing with the example of the coffee shop, the analytics may seem to indicate that during a statistical average week, the number of voids involving refunds seem to unusually out number the number of voids involving items. In other words, the analytics seem to suggest that the number of voids involving refunds may be outside the statistical range for the coffee shop. In accordance with various embodiments, a user friendly interface may be provided to facilitate visual analysis of the unusual transactions.

The user friendly interface may include one or more selectable events (i.e., the number of voids involving refunds). Because the number of voids involving refunds may be outside the statistical range, the one or more selectable events may be flagged. As will be described in more detail, the flagged one or more selectable events may facilitate visual analysis of transactions utilizing analytics at least because the information associated with the voids may include video data. The user friendly interface may provide transaction information along with video data to provide a visual of the transaction. Various scenarios may be apparent from the information along with the video data. For example, the staff may have been pressing the wrong key or sets of keys, perhaps a nefarious activity may be taking place, perhaps more than the staff may be involved, etc.

As will be described in more detail, in various embodiments, a video snapshot of one or more selectable events for a time frame associated with at least one of the number of transactions may be identified. Continuing with the example of the coffee shop, the video snapshot may be identified corresponding to the voided transactions including details of the transactions such as, but not limited to, staff member name and/or identification (e.g., employee name and/or employee number), time of the transaction, details and/or nature of the transaction, location of the transaction, device used in the transaction, etc.). In order to provide improved details and/or alternate details of the transactions, one or more video devices may be coordinated to provide information, in accordance with various embodiments. The video snapshot of the one or more selectable events may be correlated with the one or more selectable events generated based at least in part on the performed analytics. As a result, visual analysis of transactions utilizing analytics may be facilitated.

Before moving on the detailed description of the various embodiments, some examples of method and apparatus for video surveillance may be shown in U.S. patent application Ser. No. 10/957,021, published as Application Publication No. US 2005/0177859 claims priority to provisional application 60/543,298, both of which are expressly incorporated by reference.

FIG. 1 illustrates an example system for visual analysis of transactions, in accordance with various embodiments. Shown in FIG. 1, a system 100 may comprise of first transaction location 102 and a second transaction location 104. Additionally, the system 100 may include a transaction analytics/analysis module 106 (TAAM) and a client device 108. The TAAM 106 may include a storage 110. As shown, the first transaction location 102, the second transaction location 104, the TAAM 106, and client device 108 may all be communicatively coupled to a network 112. Accordingly, the first transaction location 102, the second transaction location 104, the TAAM 106, and client device 108 may all be communicatively coupled with each other via the network 112.

The first transaction location 102 and the second transaction location 104 may be shown and referred to as various forms of transaction information gathering device such as, but not limited to, registers, kiosks, computing devices (e.g., desktop computing devices, handheld computing devices, tablets, smart phones, wearable smart devices including glasses, clothing, and the like), various video devices including digital or analog based video devices, etc., and any combination thereof. In order to describe the disclosed subject matter, the first transaction location 102 may be referred to as a first video device 102 and the second transaction location 104 may be referred to as a second video device 104. As will be described, the first video device 102 and the second video device 104 may be located in any location. For example, the first video device 102 may be located in one part of an establishment, while the second video device 104 may be located in a second part of the establishment. In another example, the first video device 102 may be located in a first city, while the second video device 104 may be located in a second city. Accordingly, the first video device 102 and the second video device 104 may be located in any location. Additionally, the first and second video devices 102 & 104 may be a wide variety of video devices such as, but not limited to, analog type video cameras, video devices utilizing charge-coupled devices (CCD), video devices utilizing complementary metal-oxide semiconductor (CMOS), etc., and any combination thereof.

The TAAM 106 may be a wide variety computer program products, which may be included in a wide variety of computing devices such as, but not limited to desktop computing devices, server type computing devices handheld computing devices, tablets, smart phones, wearable smart devices, etc., and any combination thereof. In FIG. 1, storage 110 may help facilitate storage of transaction information from the first and/or second video devices 102 & 104. Additionally, storage 110 may include machine readable instructions. As shown in FIG. 1, TAAM 106 may include storage 110. However, it should be appreciated that TAAM 106 and storage 110 may be communicatively coupled in a wide variety of manners such as, but not limited to, being located in separate locations communicatively coupled via the network 112 in a ubiquitous computing (ubicomp) type of system, cloud computing type system, wide area local area network (WLAN), local area network (LAN), etc., and any combination thereof. Additionally, storage 112 may be a wide variety of storage such as, but not limited to, mechanical, optical, electrical, etc., and any combination thereof including some further examples described herein.

Client device 108 may be a wide variety of client type devices such as, but not limited to, registers, kiosks, computing devices (e.g., desktop computing devices, handheld computing devices, tables, smart phones, wearable smart devices including glasses, clothing, and the like), etc., and any combination thereof. In FIG. 1, the TAAM 106 and client device 108 may be shown as communicatively coupled via the network 112. However, it should be appreciated that the TAAM and client device 108 may be communicatively coupled in a wide variety of manners such as, but not limited to, communicatively coupled as a single computing device, as a ubicomp system, a cloud system, etc., and any combination thereof.

As may be appreciated, the network 112 may be a wide variety of networks such as, but not limited to, wireless network, wired network, ubicomp network, cloud network, WLAN, LAN, world wide web, Internet, etc., and any combination thereof. The network 112 may help facilitate communication between all sorts of communication capable devices, where the communication may be in any form such as, but not limited to, electrical, optical, digital, analog, neural, organic, etc., and any combination thereof.

Again referring to the non-limiting example of an establishment where a transaction may occur and may be recorded in real-time (e.g., live stream) of a coffee shop, the TAAM 106 may receive information associated with a number of transactions such as, but not limited to, voided transactions from the video device 102 and/or video device 104 via the network 112. The TAAM 106 may perform analytics on the voided transactions. Based at least in part on the performed analytics, the TAAM 106 may generate one or more selectable events. The selectable events may be correlated with the voided transactions. Additionally, as part of performing the analytics, the TAAM 106 may determine if the performed analytics is substantially outside a predetermined range. Further, if the TAAM 106 determines that the performed analytics is substantially outside the predetermined range, the one or more selectable events may be flagged, in accordance with various embodiments. As an example, for a statistical average week, the number of voids involving refunds should be within 20 percent of the number of voids involving items. However, if the TAAM 106 determines that the number of voids involving refunds is substantially outside 20 percent of the number of voids involving items, the transactions involving voids may be flagged. As will be described in further detail, the flagged transaction may be displayed in an interface to help facilitate visual analysis of transactions utilizing analytics.

As previously alluded to, the transaction information including video data may include transaction information simple as when a cash register is opened and closed. However, the transaction information including video data may include transaction information as sophisticated as machine vision related information. In an example, the first and/or the second video devices 102 & 104, may include machine vision modules that can detect various actions within the field of view, similar to various interactive gaming consoles. The machine vision capable video device may be able to analyze the actions of the images to determine the nature of the transaction. One example of analyzing the actions captured by a machine vision capable video device may be the capability of recognizing when the cash register till has been opened without having the cash register send a separate signal. In accordance with various embodiments, analytics may be performed, and recognizing when a cash register is opened and closed may help control some nefarious activities, thereby at least helping to reduce economic losses.

In another example, the first and/or the second video devices 102 & 104 may be capable of recognizing certain cards being dealt in a setting such as a gambling establishment, where card games of chance may be played (e.g., blackjack, baccarat, poker, etc.). In accordance with various embodiments, analytics may be performed on the transaction information, and the ability to recognize certain cards being dealt may help determine the odds for the establishment, thereby at least helping to ensure equitable odds for the establishment.

In yet another example, the first and/or the second video devices 102 & 104 may have facial recognition related capabilities. For example, the transaction information including video data may include facial recognition of a person involved in a first transaction and recognizing the same person in a subsequent transaction. Analytics may be performed on the transaction information, in accordance with various embodiments. The ability to recognize a person in transactions may facilitate determining the person's habits such as, but not limited to, purchasing habits, thereby at least helping to facilitate targeted advertising and/or marketing. Another application may be recognizing a person at a gambling establishment to determine the person's various gambling habits, thereby helping the establishment provide a more personal experience to the person.

In yet another example, the first and/or the second video devices 102 & 104 may have coordination capabilities. For example, the TAAM 106 may have determined to flag a particular transaction or transactions as described previously. If a second subsequent transaction is received from the first video device 102 and analyzed, and it turns out that the second subsequent transaction corresponds to the previously flagged first transaction(s) (i.e., substantially similar transaction is detected), the TAAM 106 may transmit a signal to the second video device 104 to capture the second subsequent transaction. The first video device 102 and the second video device 104 may be coordinated to provide alternate views of the second subsequent transaction. As can be appreciated, the coordination between the first and second video devices 102 & 104 may be facilitated if they are within the field of view of each other.

It is contemplated within the scope of the disclosed subject matter that any combination or combinations of the previous examples of video device capabilities may be implemented. For example, one combination may be that the first and/or second video devices 102 & 104 may include machine vision capabilities such as facial recognition along with coordination capabilities. Accordingly, expanding upon the previous example of the analysis and detection of a flagged transaction, along with the analysis and/or detection of a previously flagged first transaction(s), the first video device 102 may be coordinated with the second video device 104 upon recognition of a person associated with the flagged first transaction even though the second subsequent transaction may not be substantially similar to the first flagged transaction. As alluded to, since a person's interaction may be determined from performing analytics on information associated with transactions, a person's habits may also be flagged.

As previously described, information associated with a number of transactions including video data may also include, among a wide range of data, at least data associated with location(s) of the first and/or second video devices 102 & 104. From the previous descriptions, it should be appreciated that a wide range data may be included in the information such as, but not limited to, nature of the transactions, geographic location of the transactions, type of establishment (e.g., merchant type/POS, financial institution, bank, casino, etc.), and demographic data associated with the transactions. For example, the TAAM 106 may aggregate the myriad of data based at least in part on one of the data associated with the nature of the transactions (e.g., voids, sales, blackjack deal, etc.), merchant type (e.g., coffee shop, department store, casino, tavern, bar, bank, office, etc.), or demographic data (e.g., urban, suburban, rural region, predominantly Asian region, a certain average income, including ethnic, gender, religious, race, sexual orientation, and age group, economic factor, etc.), and accordingly, the claimed subject matter is not limited in these respects. It should be appreciated that if the first video device 102 is geographically remote from the second video device 104, the TAAM 106 may synchronize the data (e.g., the first video device 102 may be located in Las Vegas, Nev., U.S.A., while the second video device 104 may be located in Macau, Special Administrative Region of the People's Republic of China). The TAAM 106 may perform an analytics on the aggregated data, thereby generating one or more selectable events. These selectable events may be correlated with the synchronized data helping to facilitate visual analysis of transactions utilizing analytics without needing to take into account time differences where the transactions occurred.

It should be pointed out that the use of the term "flag" is generic as an indicator of some kind such as, but not limited to a visual indication, an electronic indication, an analog indication (e.g., sound), a digital indication, database structure indication, register indication, etc., and accordingly, the claimed subject matter is not limited in these respects.

Figure 2:
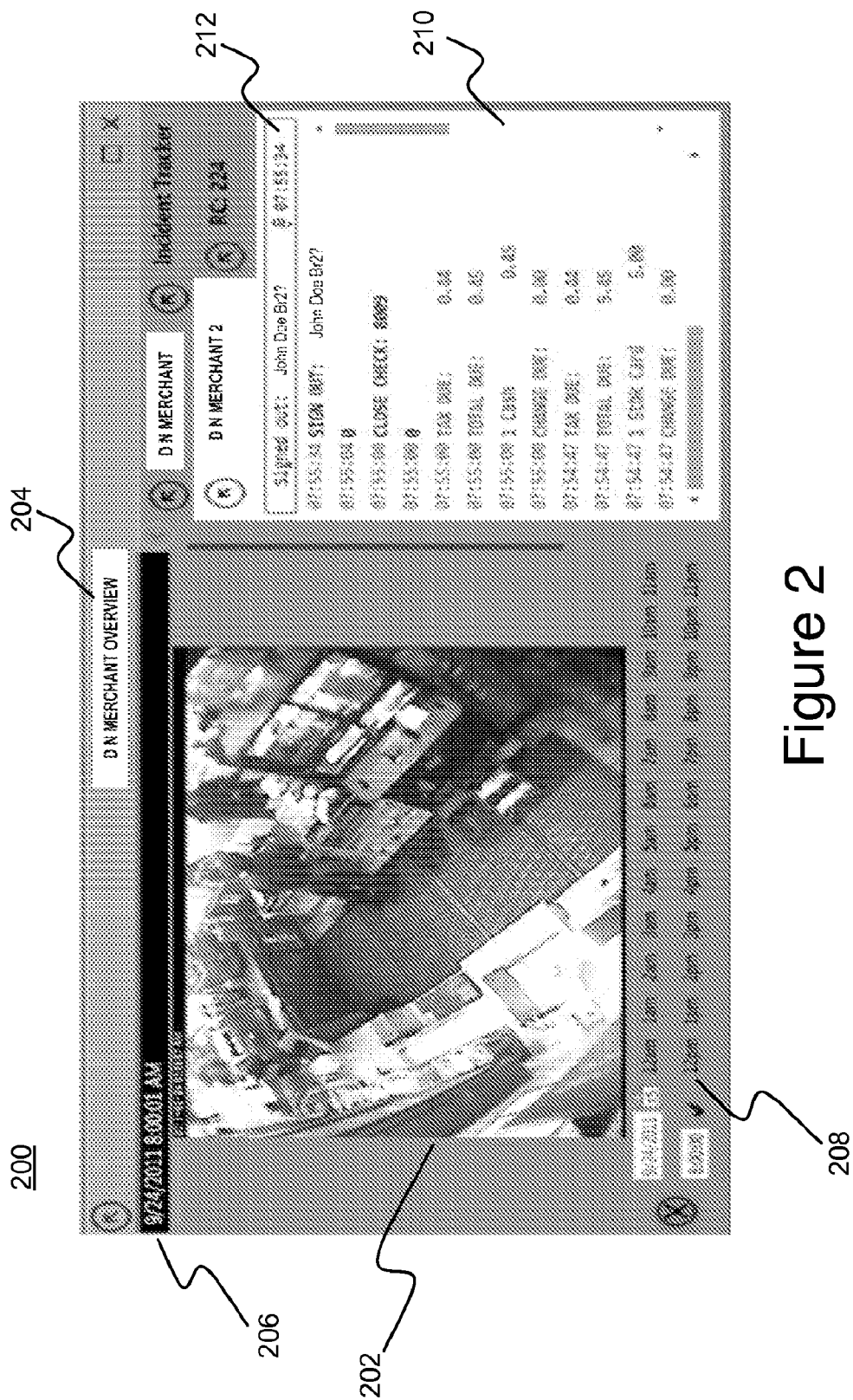
FIG. 2 illustrates an interface having transactions along with data associated with the transaction as may be viewed and captured by a video device.

FIG. 2 illustrates an interface having transactions along with data associated with the transaction as may be viewed and captured by a video device, in accordance with various embodiments. In FIG. 2, an example interface 200 may be generated on a display (not shown) communicatively coupled to a computing device. As shown, the interface 200 may include a video portion 202, an establishment identifying portion 204, a date and time portion 206, incremental time portion 208, a detailed transaction portion 210, and in this example, an employee identifying portion 212. In the example shown, the interface may be generated as a graphical user interface having displaying video data along with transaction data. It should be appreciated that the interface 200 may be generated on any number of display types such as, but not limited to, smart phones type displays, tablet type displays, televisions type displays, displays utilizing plasma type technology, displays utilizing liquid crystal display (LCD) type technology, displays utilizing organic light-emitting diode (OLED) type technology displays, displays utilizing cathode ray tube (CRT) type technology, and so forth, or any combination thereof.

The methodologies employed to generate the interface 200 may include a wide variety of implementations such as, but not limited to, Windows based operating system by Microsoft Corporation, Redmond, Wash., Mac OS (including iOS) based operating system by Apple Inc., Cupertino, Calif., Linux based operating system, Android based operating system by Google Inc., Menlo Park, Calif., web based languages (e.g., HyperText Markup Language (HTML), Extensible Markup Language (XML), and so forth), etc., and accordingly, the claimed subject matter is not limited in these respects.

In FIG. 2, as an example, the interface 200 may be implemented on the client device 108 (shown in FIG. 1). Continuing with the non-limiting example of the coffee shop, as shown in FIG. 2, the interface 200 may provide the name of the coffee shop 204, date and time 206 of the video data 202, the coffee shop employee's name and identification 212, and a listing of all of the transactions occurring 210 in the video data 202 (e.g., sign out: John Doe Br2?, CLOSE CHECK: 8009, TAX DUE:, and so forth. Additionally, the interface 200 may be a user interactive interface, where a user (not shown) may interact with the interface 200. For example, incremental time portion 208 may be utilized to play back video data associated with various time frames. The interface 200 may also illustrate at least some of the information received by the TAAM 106 (shown in FIG. 1). However, it should be appreciated that the interface 200 may be configured in any manner to gather information associated with transactions including video data, and accordingly, the claimed subject matter is not limited in these respects.

Figure 3:
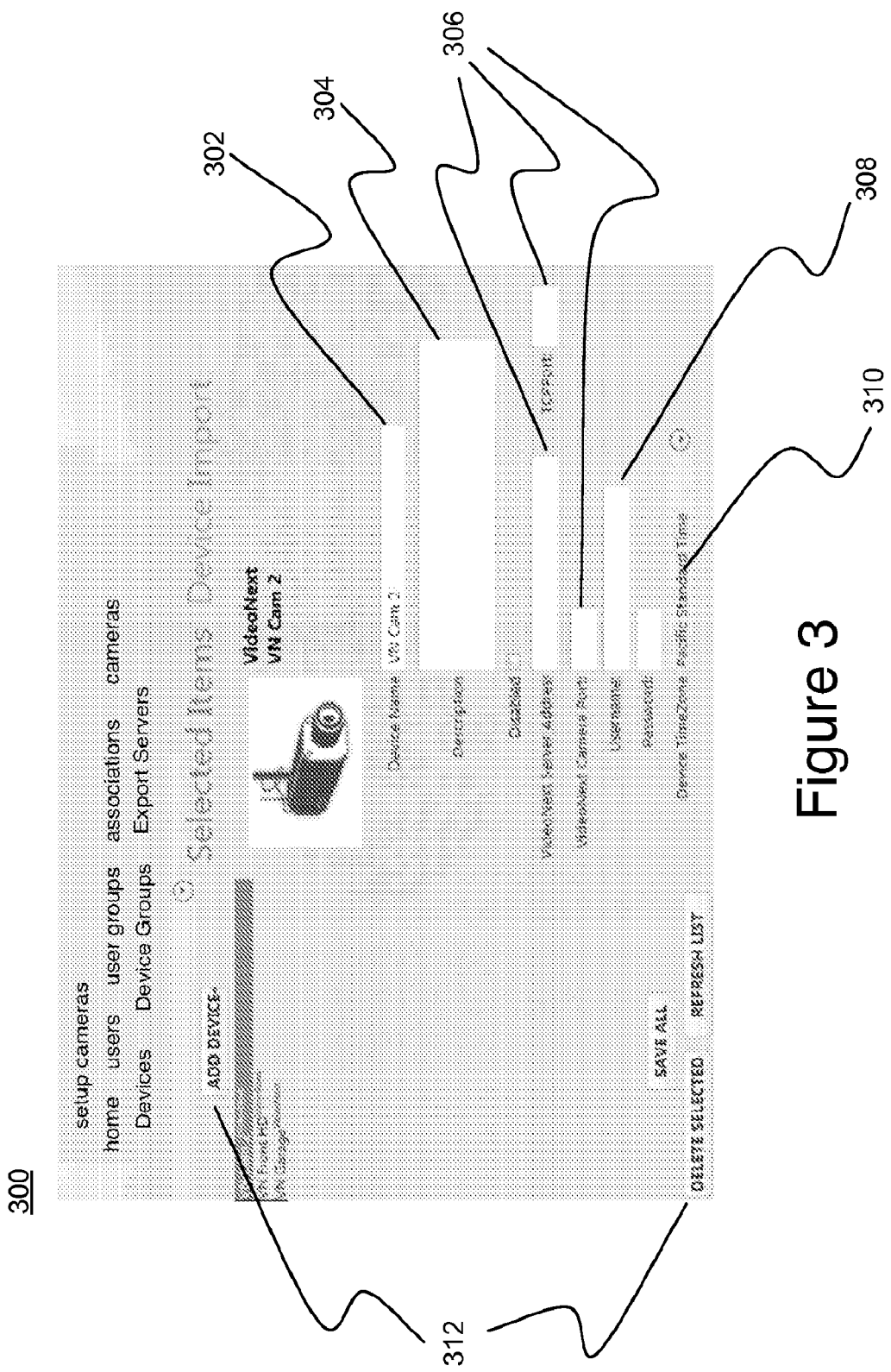
FIG. 3 illustrates an example interface to facilitate interaction with a video device.

FIG. 3 illustrates an example interface to facilitate interaction with a video device, in accordance with various embodiments. In FIG. 3, an interface 300 to facilitate interaction with a video device is shown. The interface 300 may facilitate interaction with the first video device 102 and/or the second video device 104 (both shown in FIG. 1). To facilitate interaction with the first and/or second video devices 102 & 104, the interface 300 may include a number of fields to provide various information regarding the first and/or second video devices 102 & 104. As shown in this example, the fields may include but not limited to video device names 302, description 304, various location indicators of the video device 306 (e.g., Internet Protocol (IP) address, Transmission Control Protocol (TCP) port, and camera port). Additionally, the user interface 300 may include security related fields 308 such as, but not limited to, "Username" and "Password". Further, the interface 300 may include a time synchronization field 310, which may, for example, show relevant time zones. The interface 300 may also include various fields for setting up a video device 310 such as, but not limited to, ADD DEVICE, SAVE ALL, and REFRESH LIST. It should be appreciated that the example interface 300 shown in FIG. 3 may be configured in any manner to facilitate interaction with video devices, and accordingly, the claimed subject matter is not limited in these respects.

Figure 4:
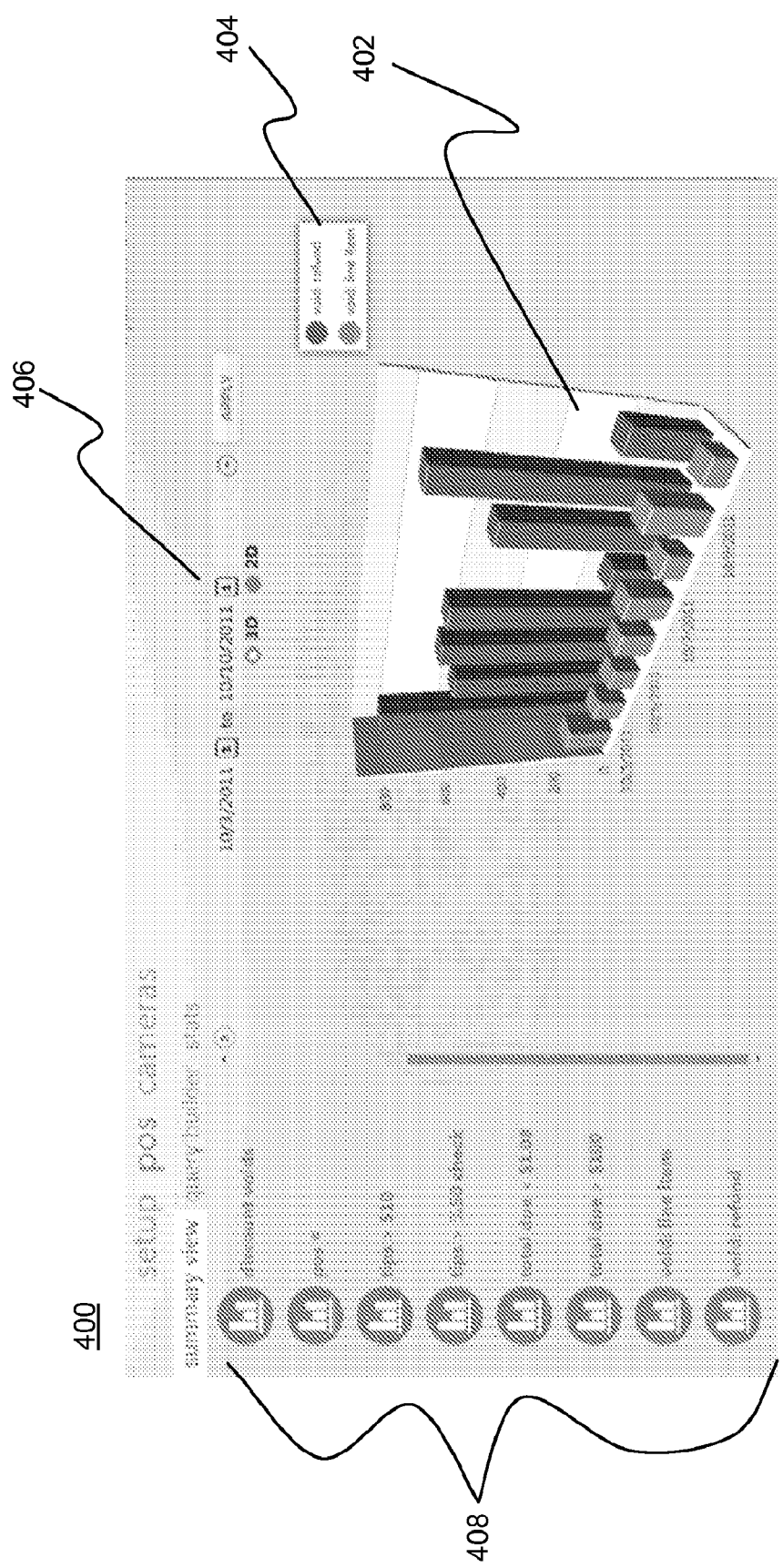
FIG. 4 illustrates example results of analytics performed on various transactions.

FIG. 4 illustrates example results of analytics performed on various transactions, in accordance with various embodiments. As shown in FIG. 4, an analytics result interface 400 may be generated to facilitate graphical views of the results associated with the performed analytics. In the example shown in FIG. 4, the interface 400 may include a graph 402 illustrating some of the results of the performed analytics. The graph 402 may include details of transactions 404 and date ranges. Additionally, the interface 400 may include various fields and/or areas to facilitate interaction with the interface such as, but not limited to, various nature of the transactions being viewed (e.g., discount voids, pos #, tips>$10, tips>%50 check, total due, void: line item, void: refund, etc.). Further, the interface 400 may provide a visual indication of the transaction, which may be determined to be outside a predetermined range, in accordance with various embodiments. As previously described, in the example of the coffee shop, in the interface 400, the graph 402 seems to indicate that the number of voids involving refunds seem to unusually out number the number of voids involving items as shown in the details of the nature of the transactions 404 (i.e., the legend of the graph 402). In other words, the analytics seem to suggest that the number of voids involving refunds may be outside the statistical range for the coffee shop. In accordance with various embodiments, a user friendly interface may be provided to facilitate visual analysis of the unusual transactions. It should be appreciated that the example interface 400 shown in FIG. 4 may be configured in any manner to facilitate graphical views of the results associated with the performed analytics, and accordingly, the claimed subject matter is not limited in these respects.

FIG. 5 illustrates an example interface to facilitate interaction with some of the results of the analytics performed on the various transactions, in accordance with various embodiments. Shown in FIG. 5 is an example interface 500 laid out in a grid like manner. The interface 500 may include various headings 502 across the top such as, but not limited to, ASSOCIATIONS, DETAILS, BASIC DATA, TIME, TERMINAL NAME, TERMINAL, EMPLOYEE, EMPLOYEE NAME. The interface 500 may include under the headings 502, various line items 504, where the line items 504 may be description of line items below each of the headings 502. For example, shown in FIG. 5, under each of the headings 502, the line items 504 may include, but not limited to, a symbol of a video device, a symbol of a document, nature of the transaction (e.g., void, discount, etc.), date and time, where the transaction information may be received from (e.g., location of the video device), video device number, employee number, and employee name, respectively. As will be described, the interface 500 may help facilitate visual analysis of transactions utilizing analytics, in accordance with various embodiments.

Figure 6:
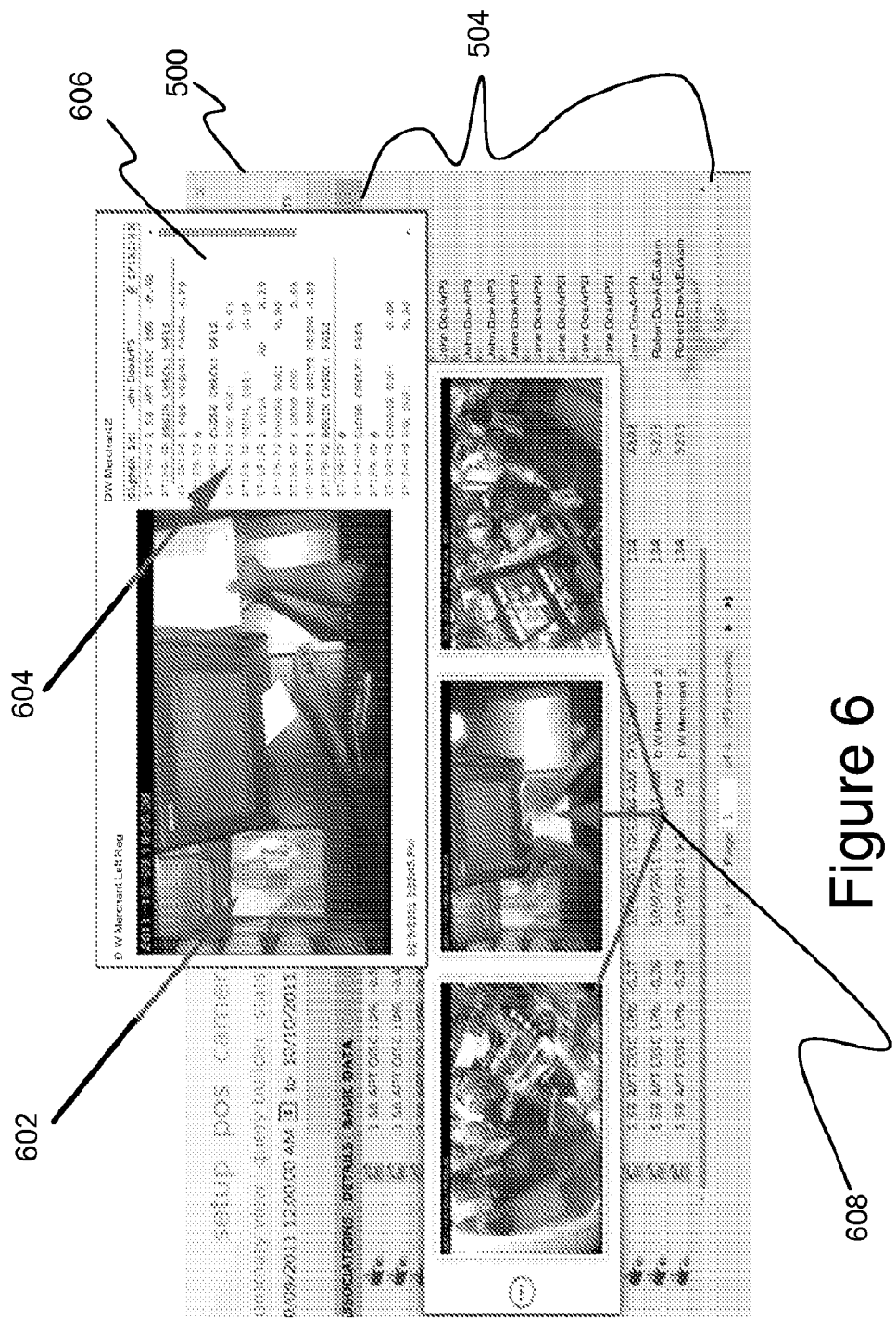
FIG. 6 illustrates examples of data available from an example interface to facilitate interaction with some results of analytics performed on the various transactions.

FIG. 6 illustrates examples of data available from an example interface to facilitate interaction with some results of analytics performed on the various transactions, in accordance with various embodiments. Shown in FIG. 6, the interface 500 (shown in FIG. 5) may include data such as, but not limited to, video data 602 and detailed transaction data 604. The video data 602 and the detailed transaction data 604 may be displayed in portions of display 606 similar to the interface 200 (shown in FIG. 2). In accordance with various embodiments, the interface 500 may be interacted in a manner where detecting a selection of one of the events (e.g., line items 504) may generate display 606 showing video data 602 and the detailed transaction data 604. Additionally shown in FIG. 6 are video data from more than one video device 608 for the particular transaction associated with the selected line item 504 facilitating multiple views (e.g., alternative views) of the transaction. As previously described, as a result of the analytics being performed on the transactions, the selectable events may be flagged (e.g., the number of voids involving refunds example).

Figure 7:
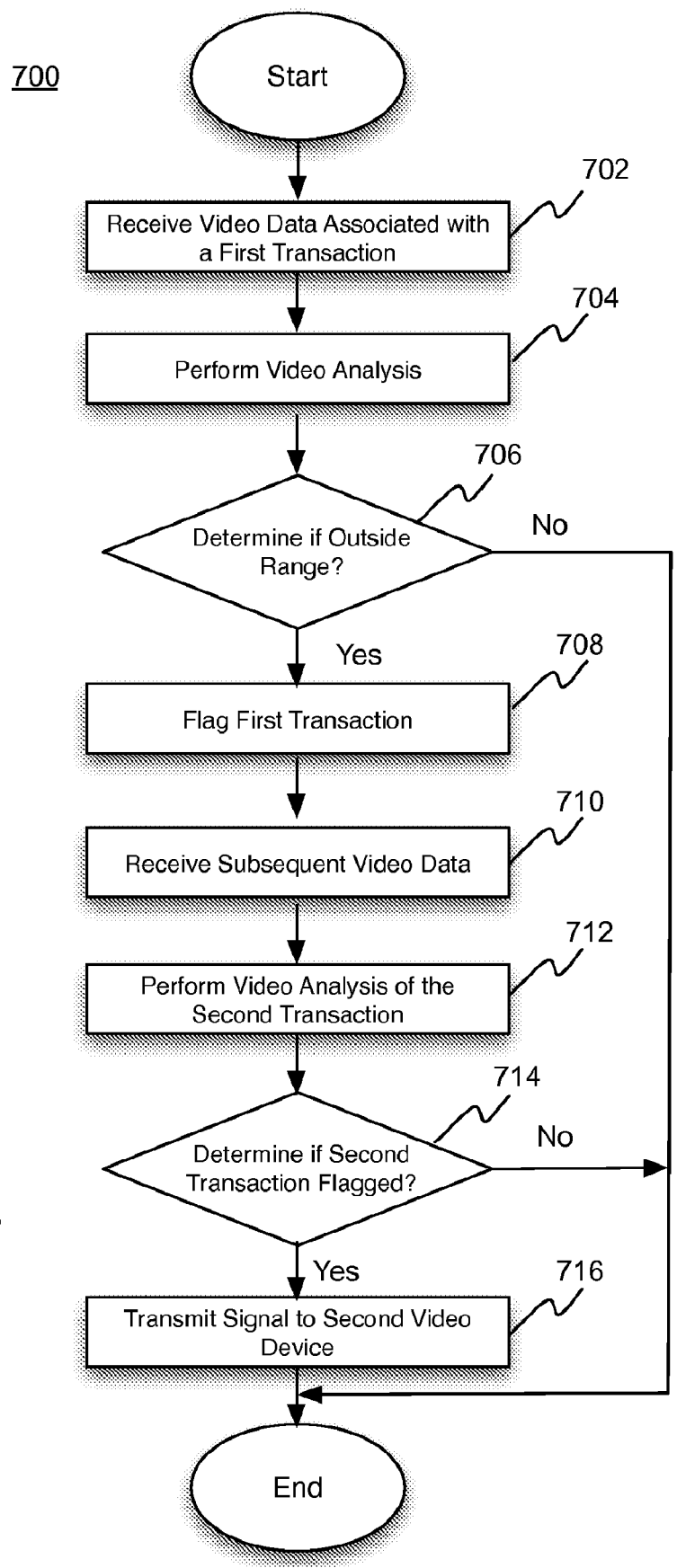
FIG. 7 illustrates an operational flow for visual analysis of transactions.

FIG. 7 illustrates an operational flow for visual analysis of transactions, arranged in accordance with at least some embodiments described herein. In some portions of the description, illustrative implementations of the method are described with reference to elements of the system 100 depicted in FIG. 1. However, the described embodiments are not limited to these depictions. More specifically, some elements depicted in FIG. 1 may be omitted from some implementations of the methods details herein. Furthermore, other elements not depicted in FIG. 1 may be used to implement example methods detailed herein.

Additionally, FIG. 7 employs block diagrams to illustrate the example methods detailed therein. These block diagrams may set out various functional block or actions that may be described as processing steps, functional operations, events and/or acts, etc., and may be performed by hardware, software, and/or firmware. Numerous alternatives to the functional blocks detailed may be practiced in various implementations. For example, intervening actions not shown in the figures and/or additional actions not shown in the figures may be employed and/or some of the actions shown in one figure may be operated using techniques discussed with respect to another figure. Additionally, in some examples, the actions shown in these figures may be operated using parallel processing techniques. The above described, and other not described, rearrangements, substitutions, changes, modifications, etc., may be made without departing from the scope of the claimed subject matter.

In some examples, operational flow 700 may be employed as part of a visual analysis of transactions. Beginning at block 702 ("Receive Video Data Associated with a First Transaction"), the TAAM 106 (shown in FIG. 1) may receive video data associated with a first transaction from a first video device 102, where the first video device 102 corresponding to a first location.

Continuing from block 702 to 704 ("Perform Video Analysis"), the TAAM 106 may perform video analysis of the first transaction. Video analysis may include analytics as previously described.

Continuing from block 704 to 706 ("Determine if Outside Range?"), the TAAM 106 may determine if the video analysis results in the first transaction is substantially outside a predetermined range. As previously described, a predetermined range may be any range, where an establishment may set the predetermined range to help facilitate observation of transactions of interest.

Continuing from block 706 to 708 ("Flag the First Transaction"), the TAAM 106 may flag the first transaction if it is determined that the first transaction is substantially outside the predetermined range. The flagged transaction may be transactions that may indicate various activities as described.

Continuing from block 708 to 710 ("Receive Subsequent Video Data"), the TAAM 106 may receive subsequent video data associated with a second transaction from the first video device 104. The video data associated with the second transaction may be a wide variety of video data.

Continuing from block 710 to 712 ("Perform Video Analysis of the Second Transaction"), the TAAM 106 may perform video analysis of the second transaction. The analysis may include a wide variety of analysis.

Continuing from block 712 to 714 ("Determine Second Transaction Flagged?"), the TAAM may determine if the second transaction corresponds to the flagged transaction. Briefly referring back to FIG. 1, the first video device 102 may view/record video data relating to a subsequent second transaction.

Continuing from block 714 to 716 ("Transmitting Signal Second Video Device"), the TAAM 106 may transmit a signal to the second video device 104 to capture the second transaction. The second video device may correspond to a second location and the first and second video devices 102 & 104 may be coordinated to provide alternative views of the second transaction providing further details of the transaction. Examples of alternative views may be illustrated as alternative view video data 608 (shown in FIG. 6).

In general, the operational flow described with respect to FIG. 7 and elsewhere herein may be implemented as a computer program product, executable on any suitable computing system, or the like. For example, a computer program product for facilitating visual analysis of transactions utilizing analytics may be provided. Example computer program products are described with respect to FIG. 8 and elsewhere herein.

FIG. 8 illustrates an example computer program product 800, arranged in accordance with at least some embodiments described herein. Computer program product 800 may include machine readable non-transitory medium having stored therein instructions that, when executed, cause the machine to facilitate visual analysis of transactions utilizing analytics according to the processes and methods discussed herein. Computer program product 800 may include a signal bearing medium 802. Signal bearing medium 802 may include one or more machine-readable instructions 804, which, when executed by one or more processors, may operatively enable a computing device to provide the functionality described herein. In various examples, some or all of the machine-readable instructions may be used by the devices discussed herein.

In some examples, the machine readable instructions 804 may include receiving video data associated with a first transaction from a first video device, the first video device corresponding to a first location. In some examples, the machine readable instructions 804 may include performing video analysis of the first transaction. In some examples, the machine readable instructions 804 may include determining if the video analysis results in the first transaction is substantially outside a predetermined range. In some examples, the machine readable instructions 804 may include flagging the first transaction if it is determined that the first transaction is substantially outside the predetermined range. In some examples, the machine readable instructions 804 may include receiving subsequent video data associated with a second transaction from the first video device. In some examples, the machine readable instructions 804 may include performing video analysis of the second transaction. In some examples, the machine readable instructions 804 may include determining if the second transaction corresponds to the flagged first transaction. In some examples, the machine readable instructions 804 may include transmitting a signal to a second video device to capture the second transaction, the second video device corresponding to a second location and the first and second video devices coordinated to provide alternative views of the second transaction.

In some implementations, signal bearing medium 802 may encompass a computer-readable medium 806, such as, but not limited to, a hard disk drive, a Compact Disc (CD), a Digital Versatile Disk (DVD), a digital tape, memory, etc. In some implementations, the signal bearing medium 802 may encompass a recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communication link, a wireless communication link, etc.). In some examples, the signal bearing medium 802 may encompass a machine readable non-transitory medium.

In general, the methods described with respect to FIG. 7 and elsewhere herein may be implemented in any suitable computing system. Example systems may be described with respect to FIG. 9 and elsewhere herein. In general, the system may be configured to facilitate visual analysis of transactions utilizing analytics.

Figure 9:
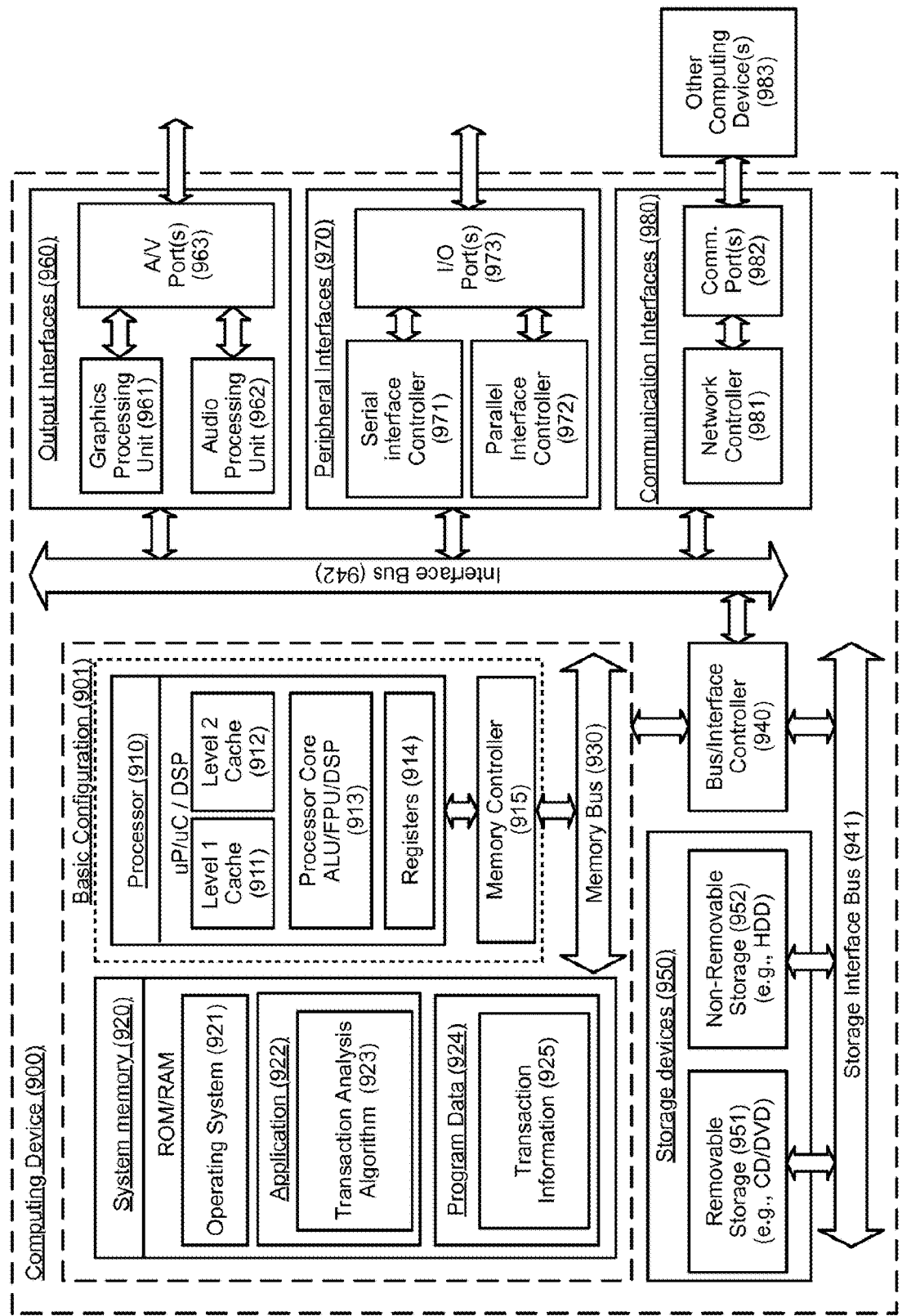
FIG. 9 is an illustration of a block diagram of an example computing device, all arranged in accordance with at least some embodiments described herein.

FIG. 9 is a block diagram illustrating an example computing device 900, such as might be embodied by a person skilled in the art, which is arranged in accordance with at least some embodiments of the present disclosure. In one example configuration 901, computing device 900 may include one or more processors 910 and system memory 920. A memory bus 930 may be used for communicating between the processor 910 and the system memory 920.

Depending on the desired configuration, processor 910 may be of any type including but not limited to a microprocessor (µP), a microcontroller (µC), a digital signal processor (DSP), or any combination thereof. Processor 910 may include one or more levels of caching, such as a level one cache 911 and a level two cache 912, a processor core 913, and registers 914. The processor core 913 may include an arithmetic logic unit (ALU), a floating point unit (FPU), a digital signal processing core (DSP Core), or any combination thereof. A memory controller 915 may also be used with the processor 910, or in some implementations the memory controller 915 may be an internal part of the processor 910.

Depending on the desired configuration, the system memory 920 may be of any type including but not limited to volatile memory (such as RAM), non-volatile memory (such as ROM, flash memory, etc.) or any combination thereof. System memory 920 may include an operating system 921, one or more applications 922, and program data 924. Application 922 may include transaction analysis algorithm 923 that is arranged to perform the functions as described herein including the functional blocks and/or actions described. Program Data 924 may include transaction information 925 for use with transaction analysis algorithm 923. In some example embodiments, application 922 may be arranged to operate with program data 924 on an operating system 921 such that implementations of facilitating visual analysis of transactions utilizing analytics may be provided as described herein. For example, apparatus described in the present disclosure may comprise all or a portion of computing device 900 and be capable of performing all or a portion of application 922 such that implementations of facilitating visual analysis of transactions utilizing analytics may be provided as described herein. This described basic configuration is illustrated in FIG. 9 by those components within dashed line 901.

Computing device 900 may have additional features or functionality, and additional interfaces to facilitate communications between the basic configuration 901 and any required devices and interfaces. For example, a bus/interface controller 940 may be used to facilitate communications between the basic configuration 901 and one or more data storage devices 950 via a storage interface bus 941. The data storage devices 950 may be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of device 900.

Computing device 900 may also include an interface bus 942 for facilitating communication from various interface devices (e.g., output interfaces, peripheral interfaces, and communication interfaces) to the basic configuration 901 via the bus/interface controller 940. Example output interfaces 960 may include a graphics processing unit 961 and an audio processing unit 962, which may be configured to communicate to various external devices such as a display or speakers via one or more NV ports 963. Example peripheral interfaces 960 may include a serial interface controller 971 or a parallel interface controller 972, which may be configured to communicate with external devices such as input devices (e.g., keyboard, mouse, pen, voice input device, touch input device, etc.) or other peripheral devices (e.g., printer, scanner, etc.) via one or more I/O ports 973. An example communication interface 980 includes a network controller 981, which may be arranged to facilitate communications with one or more other computing devices 990 over a network communication via one or more communication ports 982. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 900 may also be implemented as a personal computer including both laptop computer and non-laptop computer configurations. In addition, computing device 900 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method comprising:
  receiving, by a handheld computing device, video data associated with a first transaction from a first video device, the first video device corresponding to a first location and having data associated with a nature of the first transaction;
  performing, by the handheld computing device, video analysis of the first transaction, the video analysis based, at least in part, on the nature of the first transaction;
  determining, by the handheld computing device, if the video analysis results in the first transaction is substantially outside a predetermined range based, at least in part, on the nature of the first transaction;
  flagging, by the handheld computing device, the first transaction if it is determined that the first transaction is substantially outside the predetermined range based, at least in part, on the nature of the first transaction;
  receiving, by the handheld computing device, subsequent video data associated with a second transaction from the first video device, the second transaction having data associated with a nature of the second transaction;

performing, by the handheld computing device, video analysis of the second transaction, the video analysis based, at least in part, on the nature of the second transaction;

determining, by the handheld computing device, if the second transaction corresponds to the flagged first transaction based, at least in part, on a comparison of the nature of the first transaction with the nature of the second transaction;

transmitting, by the handheld computing device, a signal to a second video device to capture the second transaction if it is determined that the second transaction corresponds to the flagged first transaction, the second video device corresponding to a second location remote from the first video device;

coordinating, by the handheld computing device, the first video device with the second video device to receive alternative views of the first transaction and the second transaction; and synchronizing, by the handheld computing device, the alternative views of the first transaction with the second transaction based, at least in part, on the data associated with the nature of the first transaction and the data associated with the nature of the second transaction.

2. The method of claim 1, wherein receiving video data associated with the first transaction information comprises receiving video data associated with a point of sale.

3. The method of claim 1, wherein performing video analysis comprises machine vision analysis.

4. The method of claim 1, wherein determining if the video analysis results in the first transaction is substantially within a predetermined range comprises performing analytics on the received video data associated with the first transaction.

5. The method of claim 4 further comprising:
generating one or more selectable events based at least in part on the performed analytics; and
correlating the one or more selectable events with the received video data associated with the first transaction from the first video device.

6. The method of claim 1, wherein transmitting the signal to the second video device to capture the second transaction comprises transmitting a signal to a second video device within a predetermined proximity to the first video device.

7. The method of claim 1 further comprising:
generating one or more selectable events based at least in part on the transactions and video data from the first and second video devices; and
correlating the one or more selectable events with the received video data associated with the first transaction from the first video device and the subsequent transaction from the second video device.

8. A machine readable non-transitory medium having stored therein instructions that, when executed by one or more processors, operatively enable a transaction analytics/analysis module to:
receive, by a handheld computing device, video data associated with a first transaction from a first video device, the first video device corresponding to a first location and having data associated with a nature of the first transaction;
perform, by the handheld computing device, video analysis of the first transaction, the video analysis based, at least in part, on the nature of the first transaction;
determine, by the handheld computing device, if the video analysis results in the first transaction is substantially outside a predetermined range based, at least in part, on the nature of the first transaction;
flag, by the handheld computing device, the first transaction if it is determined that the first transaction is substantially outside the predetermined range based, at least in part, on the nature of the first transaction;
receive, by the handheld computing device, subsequent video data associated with a second transaction from the first video device, the second transaction having data associated with a nature of the second transaction;
perform, by the handheld computing device, video analysis of the second transaction, the video analysis based, at least in part, on the nature of the second transaction;
determine, by the handheld computing device, if the second transaction corresponds to the flagged first transaction based, at least in part, on a comparison of the nature of the first transaction with the nature of the second transaction;
transmit, by the handheld computing device, a signal to a second video device to capture the second transaction if it is determined that the second transaction corresponds to the flagged first transaction, the second video device corresponding to a second location remote from the first video device;
coordinate, by the handheld computing device, the first video device with the second video device to receive alternative views of the first transaction and the second transaction; and
synchronize, by the handheld computing device, the alternative views of the first transaction with the second transaction based, at least in part, on the data associated with the nature of the first transaction and the data associated with the nature of the second transaction.

9. The machine readable non-transitory medium of claim 8, wherein the stored instruction that, when executed by one or more processors, further operatively enable transaction analytics/analysis module to receive video data associated with a point of sale.

10. The machine readable non-transitory medium of claim 8, wherein the stored instruction that, when executed by one or more processors, further operatively enable transaction analytics/analysis module to perform analysis using machine vision.

11. The machine readable non-transitory medium of claim 8, wherein the stored instruction that, when executed by one or more processors, further operatively enable transaction analytics/analysis module to perform analytics on the received video data associated with the first transaction.

12. The machine readable non-transitory medium of claim 11, wherein the stored instruction that, when executed by one or more processors, further operatively enable transaction analytics/analysis module to:
generate one or more selectable events based at least in part on the performed analytics; and
correlate the one or more selectable events with the received video data associated with the first transaction from the first video device.

13. The machine readable non-transitory medium of claim 8, wherein the stored instruction that, when executed by one or more processors, further operatively enable transaction analytics/analysis module to transmit a signal to a second video device within a predetermined proximity to the first video device.

14. The machine readable non-transitory medium of claim 8, wherein the stored instruction that, when executed by one or more processors, further operatively enable transaction analytics/analysis module to:

generate one or more selectable events based at least in part on the transactions and video data from the first and second video devices; and correlate the one or more selectable events with the received video data associated with the first transaction from the first video device and the subsequent transaction from the second video device.

15. A system for facilitating visual analysis of transactions utilizing analytics comprising:
  a first video device;
  a second video device;
  a processor communicatively coupled to the first and second video devices;
  a transaction analytics/analysis module communicatively coupled to the processor, the transaction analytics/analysis module configured to:
    receive, by a handheld computing device, video data associated with a first transaction from the first video device, the first video device corresponding to a first location and having data associated with a nature of the first transaction;
    perform, by the handheld computing device, video analysis of the first transaction, the video analysis based, at least in part, on the nature of the first transaction;
    determine, by the handheld computing device, if the video analysis results in the first transaction is substantially outside a predetermined range based, at least in part, on the nature of the first transaction;
    flag, by the handheld computing device, the first transaction if it is determined that the first transaction is substantially outside the predetermined range based, at least in part, on the nature of the first transaction;
    receive, by the handheld computing device, subsequent video data associated with a second transaction from the first video device, the second transaction having data associated with a nature of the second transaction;
    perform, by the handheld computing device, video analysis of the second transaction, the video analysis based, at least in part, on the nature of the second transaction;
    determine, by the handheld computing device, if the second transaction corresponds to the flagged first transaction based, at least in part, on a comparison of the nature of the first transaction with the nature of the second transaction;
    transmit, by the handheld computing device, a signal to the second video device to capture the second transaction if it is determined that the second transaction corresponds to the flagged first transaction, the second video device corresponding to a second location remote from the first video device;
    coordinate, by the handheld computing device, the first video device with the second video device to receive alternative views of the first transaction and the second transaction; and
    synchronize, by the handheld computing device, the alternative views of the first transaction with the second transaction based, at least in part, on the data associated with the nature of the first transaction and the data associated with the nature of the second transaction.

16. The system of claim 15, wherein the transaction analytics/analysis module configured is further configured to receive video data associated with a point of sale.

17. The system of claim 15, wherein the transaction analytics/analysis module configured is further configured to perform analysis using machine vision.

18. The system of claim 15, wherein the transaction analytics/analysis module configured is further configured to perform analytics on the received video data associated with the first transaction.

19. The system of claim 18, wherein the transaction analytics/analysis module configured is further configured to identify one or more videos including transaction detail data corresponding to:
  generate one or more selectable events based at least in part on the performed analytics; and
  correlate the one or more selectable events with the received video data associated with the first transaction from the first video device.

20. The system of claim 15, wherein the transaction analytics/analysis module configured is further configured to transmit a signal to a second video device within a predetermined proximity to the first video device.

21. The system of claim 15, wherein the transaction analytics/analysis module configured is further configured to:
  generate one or more selectable events based at least in part on the transactions and video data from the first and second video devices; and
  correlate the one or more selectable events with the received video data associated with the first transaction from the first video device and the subsequent transaction from the second video device.

* * * * *